United States Patent [19]

Bachschmid et al.

[11] 4,186,704
[45] Feb. 5, 1980

[54] INSTALLATION FOR THE PREHEATING OF THE SUCTION MIXTURE OF A CARBURETOR INTERNAL COMBUSTION ENGINE BY MEANS OF THE EXHAUST GASES THEREOF

[75] Inventors: Reiner Bachschmid, Kernen; Gerlinde Gross, Stuttgart; Wolfgang Strobel, Remshalden, all of Fed. Rep. of Germany

[73] Assignee: Daimler-Benz Aktiengesellschaft, Fed. Rep. of Germany

[21] Appl. No.: 859,701

[22] Filed: Dec. 12, 1977

[30] Foreign Application Priority Data

Dec. 14, 1976 [DE] Fed. Rep. of Germany ....... 2656448

[51] Int. Cl.² .......................................... F02M 31/00
[52] U.S. Cl. .............................. 123/122 AA; 261/145; 261/144; 123/122 H
[58] Field of Search ....... 123/122 A, 122 AA, 122 E, 123/122 H; 261/144, 145

[56] References Cited

U.S. PATENT DOCUMENTS

| 1,811,540 | 6/1931 | Deppe | 123/122 H |
| 1,812,950 | 7/1931 | Heginbottom | 123/122 A |
| 3,906,914 | 9/1975 | Kirkbride | 123/122 AA |

FOREIGN PATENT DOCUMENTS

| 116555 | 2/1942 | Australia | 123/122 H |
| 778366 | 12/1934 | France | 123/122 AA |
| 222765 | 3/1924 | United Kingdom | 123/122 A |

*Primary Examiner*—Ronald H. Lazarus
*Attorney, Agent, or Firm*—Craig and Antonelli

[57] ABSTRACT

An installation for preheating the suction or intake mixture of a carburetor internal combustion engine by means of an exhaust gas branch line branching off from an exhaust gas pipe system that is equipped with an exhaust gas manifold, and extending along parts of the suction pipe system in heat-exchanging relationship therewith, and which also includes a closure valve controlling the exhaust gas partial stream flowing through the branch line; a part of the exhaust gas pipe system is constructed as Venturi pipe of a gas jet pump and the exhaust gas branch line is connected downstream of the heat-exchange area with an annular space of the gas jet pump surrounding the Venturi pipe so that by the suction in the gas jet pump the branched-off exhaust gas partial stream is sucked back into the remaining exhaust gas stream, while the closure valve is arranged in the exhaust gas branch line.

16 Claims, 2 Drawing Figures

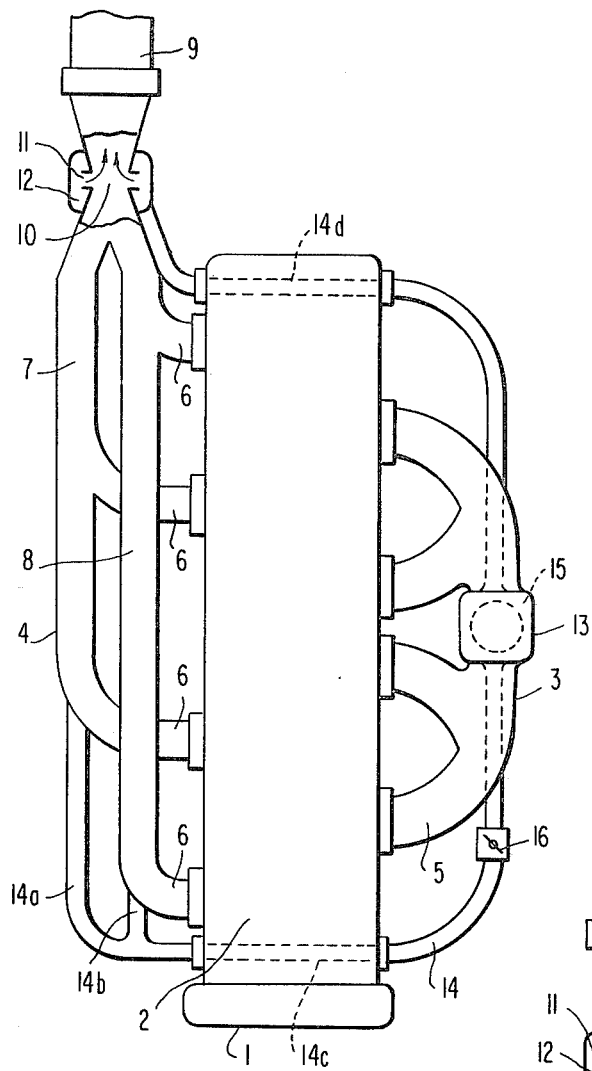
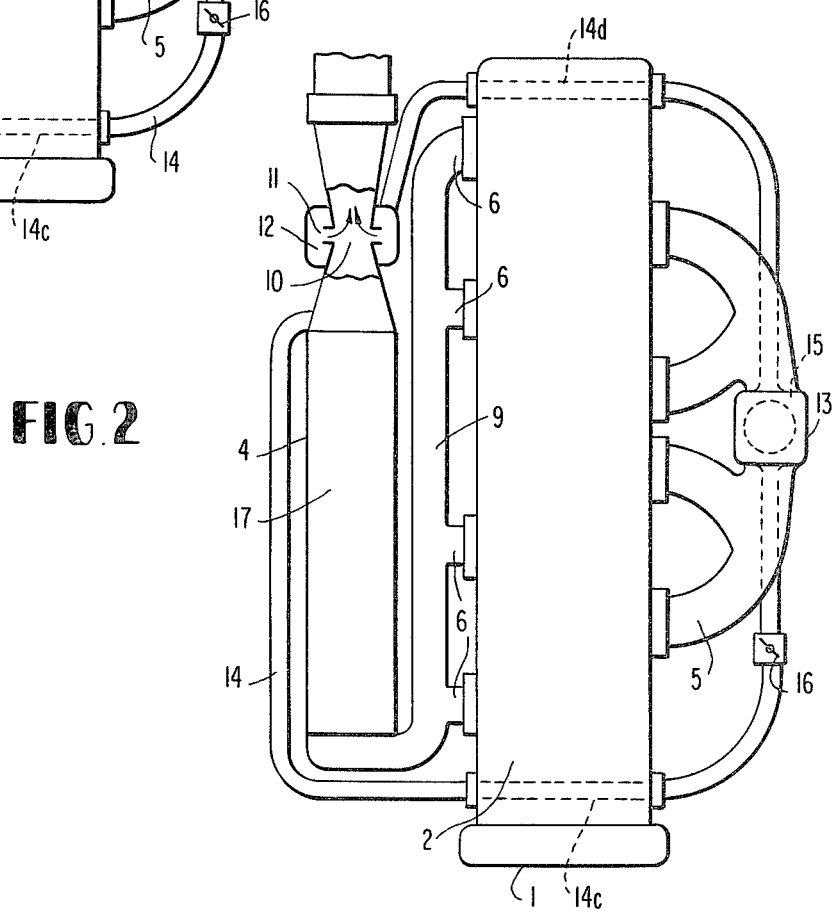
FIG. 1
FIG. 2

INSTALLATION FOR THE PREHEATING OF THE SUCTION MIXTURE OF A CARBURETOR INTERNAL COMBUSTION ENGINE BY MEANS OF THE EXHAUST GASES THEREOF

The present invention relates to an installation for preheating the suction mixture of a carburetor internal combustion engine by means of an exhaust gas branch line branched off from an exhaust gas pipe system that is equipped with an exhaust gas manifold, and extending in heat-exchanging relationship along parts of the suction pipe system as well as with a closure valve controlling the exhaust gas partial stream flowing through the exhaust gas branch line.

Prior art installations of the aforementioned type always include the closure valve for the exhaust gas partial stream in the hot exhaust gas stream of the exhaust gas pipe system, whereby the kinetic energy of the exhaust gas stream at the branching place which is most favorable as regards streamlining by the closure valve, can be utilized at the same time for the movement of the branched-off exhaust gas partial stream. However, it is disadvantageous in connection therewith that the closure valves are exposed to high thermal loads which limit their durability in an undesirable manner.

The present invention is therefore concerned with the task to so perfect an installation of the forementioned type that no thermally excessively loaded parts exist any longer and the installation can be utilized therewith over a long period of operation completely satisfactorily and at the same time also without service.

The underlying problems are solved according to the present invention in that a part of the exhaust gas pipe system is constructed as Venturi pipe of a gas injector or gas jet pump and the exhaust gas branch line is connected downstream of the heat-exchange area with an annular space of the gas jet pump surrounding the Venturi pipe in the sense of sucking-in again the branched-off exhaust gas partial stream into the remaining exhaust gas stream while the closure valve itself is arranged in the exhaust gas branch line.

By sucking back the branched-off exhaust gas partial stream by way of a gas injector or gas jet pump provided in the exhaust gas pipe system, any movable parts in the hot exhaust gas stream are obviated and the closure valve required for the control of the branched-off exhaust gas partial stream may be provided at any other thermally less loaded place of the exhaust gas branch line. A thermal loading of the closure valve which is considerably smaller compared to the prior art installations, results therefrom additionally in that the exhaust gas preheating takes place only over a relatively short period of operation of the internal combustion engine so that the exhaust gas branch line which is exposed predominantly to the external atmosphere, will be cooled off rapidly to a temperature considerably lower compared to the exhaust gas temperature, when its closure valve is in the closing position.

In a preferred construction according to the present invention, the exhaust gas branch line is extended through a part of a cooling water jacket of the internal combustion engine, and the closure valve is provided at a place of the exhaust gas branch line downstream of this passage through the cooling jacket. With such an arrangement of the closure valve in the exhaust gas branch line downstream of the passage thereof through the the cooling water jacket of the internal combustion engine, the cooling-off of the closure valve in its closing position is further accelerated.

Accordingly, it is an object of the present invention to provide an installation for the preheating of the suction mixture of a carburetor internal combustion engine by means of the exhaust gases thereof which avoids by simple means for aforementioned shortcomings and drawbacks encountered in the prior art.

Another object of the present invention resides in an installation for the preheating of the suction mixture of a carburetor internal combustion engine by means of the exhaust gases thereof in which the closure valve controlling the pre-heating flow of the exhaust gases is not exposed to excessively large thermal loads impairing its durability.

A further object of the present invention resides in an installation for the preheating of the suction mixture of a carburetor internal combustion engine in which a longer length of life of the parts thereof, especially of the control parts thereof is assured by extremely simple means.

Still a further object of the present invention resides in an installation for the preheating of the suction mixture of the type described above, in which the closure valve required for the control of the branched-off exhaust gas partial stream can be provided at any place of the exhaust gas branch line which is more favorable as regards thermal loads.

Another object of the present invention resides in an installation for the preheating of the suction mixture of a carburetor internal combustion engine by means of the exhaust gases thereof, in which the parts thereof for the control of the partial exhaust stream can be rapidly cooled-off by simple means.

These and other objects, features and advantages of the present invention will become more apparent from the following description when taken in connection with the accompanying drawing which shows, for purposes of illustration only, two embodiments in accordance with the present invention, and wherein:

FIG. 1 is a plan view on a first embodiment on the cross-current cylinder head inclusive the suction and exhaust gas pipe system of a four-cylinder internal combustion engine provided with an installation for pre-heating the suction mixture by means of the exhaust gases thereof according to the present invention; and FIG. 2 is a plan view, similar to FIG. 1, on a modified embodiment of an internal combustion engine provided with an afterburner device in its exhaust gas pipe system and with an installation for preheating the suction mixture by means of exhaust gases thereof in accordance with the present invention.

Referring now to the drawing wherein like reference numerals are used throughout the two views to designate like parts, the internal combustion engine 1 illustrated in FIG. 1 is equipped with a cross-flow cylinder head 2 which is provided on its one side (according to FIG. 1, on the right side) with a suction or intake pipe system 3 and on its other side (on the left side) with an exhaust gas pipe system 4. The internal combustion engine is a four-cylinder carburetor internal combustion engine, from which the suction pipe system 3 accordingly leads by way of four suction or intake elbows 5 to the cylinder head 2 from which, on the other hand, four short exhaust gas connecting pipes 6 lead to the exhaust gas pipe system 4.

As can be further seen from FIG. 1, the short exhaust gas connecting pipes 6 are combined pairwise into two branch manifolds 7 and 8, which in their turn, are then combined on the outlet or discharge side in the direction toward an exhaust gas manifold 9. The combining place of the two branch manifolds 7 and 8 is thereby constructed simultaneously as a Venturi pipe 10 which forms a component of a gas injector or gas jet pump, in which terminate in a conventional manner the inlet openings disposed at the narrowest place of the Venturi pipe 19 from an annular space 12 of the gas jet pump surrounding this narrowest place.

The suction pipe system 3 includes a carburetor 13 disposed in its center, toward which the combustion air flows in a conventional manner not illustrated in detail from above after passing through an air filter.

As can be further seen from FIG. 1, an exhaust gas branch line 14 is connected with the two branch manifolds 7 and 8 by way of one further branch connection 14a and 14b each, which within the area of one end of the cylinder head 2 is extended transversely through the same and leads at first to a place 15 underneath the carburetor 13. The place 15 underneath the carburetor 13 is constructed as "hot spot" and thus serves for the warming-up of the carburetor 13 by the exhaust gas partial stream flowing through the exhaust gas branch line 14. The exhaust gas branch line 14 is further extended beyond the place 15 and traverses the cylinder head 2 at the other end thereof, whereafter it terminates in the annular space 12 of the gas jet pump. Since the preheating of the suction mixture of carburetor internal combustion engines by way of a so-called "hot spot" arranged at the carburetor with the use of an exhaust gas partial stream is known as such in the art, the construction of the place 15 which may be of any known construction, requires no further description.

The internal combustion engine 1 according to the illustrated embodiment is water-cooled, whereby the two passages 14c and 14d of the exhaust gas branch line 14 through the cylinder head 2 lead at the same time through parts of the cooling water jacket of the internal combustion engine 1 in each case.

Finally, it can be additionally seen from FIG. 1 that a closure valve 16 is provided in the exhaust gas branch line 14 downstream of the passage 14c, as viewed in the flow direction, which may be actuated, for example, by the driver of the vehicle equipped with the internal combustion engine 1. The appropriateness of an opening of the closure valve 16 follows in particular with a cold start of the internal combustion engine 1 whereby already after the first start, an increasing preheating of the sucked-in combustion air and therewith a fully satisfactory, complete combustion of the mixture results in the engine. As a result of the valve opening, the suction effect at the place of the Venturi pipe 10 may become effective in the sense of a suction effect thereat of an exhaust gas partial stream through the exhaust gas branch line 14, whereby the hot spot at place 15 is heated up rapidly and leads to the pre-heating or warm-up of the sucked-in mixture.

As soon as the internal combustion engine has reached its operating temperature, the closure valve 16 is again closed, whereupon the throughflow of the exhaust gas branch line 14 takes place any longer and the exhaust gas partial stream disposed therein and therewith also the closure valve 16 will be rapidly cooled-off by the atmosphere surrounding the exhaust gas branch line 14. The rapid cooling-off is additionally enhanced in particular by the fact that the exhaust gas branch line 14 is additionally cooled-off by way of the cooling water of the internal combustion engine at the places of its passages 14c and 14d. An only very slight thermal loading of the closure valve 16 results therefrom which is circumcirculated by hot exhaust gases only in its opened condition with a running engine.

The internal combustion engine illustrated in FIG. 2 and corresponding to a second embodiment of the present invention, whose parts corresponding to those of the first embodiment are designated by the same reference numerals, differs from the first embodiment only by a different construction of its exhaust gas pipe system 4. In the embodiment according to FIG. 2, its four short exhaust gas connecting pipes 6 terminate in a common exhaust gas manifold 9, in which an afterburner installation 17 of any known construction is additionally arranged upstream of the Venturi pipe 10 which itself corresponds to the first embodiment. The exhaust gas branch line 14 is thereby connected with the exhaust gas pipe system directly downstream of the afterburner installation as viewed in the flow direction, which may be equipped in a conventional manner (not illustrated) either with a reactor or with a catalyst. Afterburner devices offer the advantage of an effective exhaust gas purification which in the instant case also prevents a soiling of the inlet openings 11 of the Venturi pipe 10 and of the exhaust gas branch line 14 inclusive the closure valve 16. Finally, the heating of the exhaust gases by the afternburner installation by about 200° C. and the pressure increase accompanying at the same time the temperature increase are beneficial to the aimed-at rapid preheating of the sucked-in mixture, which pressure increase further assures a corresponding rapid throughflow of the exhaust gas branch line 14 also at the place 15 of the heat-up of the mixture.

In lieu of a manual control for the closure valve 16, of course, also a control of the position thereof in dependence on an operating magnitude, for example, of the cooling water temperature, of the internal combustion engine, etc., may be provided. Similarly, the present invention may be provided in any other differently constructed carburetor internal combustion engine with any desired number of cylinders, for example, also in an internal combustion engine constructed as counterflow engine.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for preheating an intake mixture of a carburetor internal combustion engine, the installation comprising exhaust gas branch line means branching off from an exhaust gas manifold means of an exhaust gas pipe system, the exhaust gas branch line means extends along portions of an intake pipe system in heat-exchange relationship therewith, and a closure valve means for controlling a partial stream of exhaust gas flowing through the exhaust gas branch line means, characterized in that a portion of the exhaust gas pipe system is constructed as a Venturi pipe means of a gas jet pump means, the gas jet pump means having an annular space surrounding the Venturi pipe means, the exhaust gas branch line means is connected with the annular space at a position downstream of the heat exchange portions so as to provide for a suction action of the partial stream of exhaust gas flowing through the exhaust gas branch line means into the remaining exhaust gas stream, the closure valve means is arranged in the exhaust gas branch line means at a position upstream of the heat exchange portions, as viewed in a flow direction of exhaust gas through the exhaust gas branch line means and in that means are provided for cooling at least a portion of the exhaust gas branch line means so as to reduce a thermal loading of the closure valve means.

2. An installation for preheating an intake mixture of a carburetor internal combustion engine, the internal combustion engine including cooling water jacket means, the installation comprising exhaust gas branch line means branching off from an exhaust gas manifold means of an exhaust gas pipe system, the exhaust gas branch line means extends along portions of an intake pipe system in heat-exchange relationship therewith, and a closure valve means for controlling a partial stream of exhaust gas flowing through the exhaust gas branch line means, characterized in that a portion of the exhaust gas pipe system is constructed as a Venturi pipe means of a gas jet pump means, the gas jet pump means having an annular space surrounding the Venturi pipe means, the exhaust gas branch line means is connected with the annular space at a position downstream of the heat exchanger portion so as to provide for a suction action of the partial stream of exhaust gas flowing through the exhaust gas branch line means into the remaining exhaust gas stream, the exhaust gas branch line means includes passage means extended through a part of the cooling water jacket means, and in that a closure valve means is arranged at a position of the exhaust gas branch line means downstream of said passage means as viewed in the flow direction of the exhaust gas.

3. An installation according to claim 2, the internal combustion engine further including a cross-flow cylinder head, characterized in that at least a portion of the cooling water jacket means is arranged in the cylinder head, the passage means of the exhaust gas branch line means includes a first passage traversing the cylinder head from an exhaust side thereof to an intake side thereof and a second passage traversing the cylinder head from the intake side thereof to the exhaust side thereof with each passage extending through a part of the cooling water jacket means.

4. An installation according to claim 3, characterized in that the closure valve means is arranged in the exhaust gas branch line means between the first passage through the cylinder head and the heat-exchange portions.

5. An installation according to claim 4, characterized in that the Venturi pipe means forms a part of the exhaust gas manifold means.

6. An installation according to claim 5, characterized in that the exhaust gas branch line means is branched off from at least one portion of the exhaust gas pipe system located on an engine side of the gas jet pump means.

7. An installation according to claim 6, characterized in that the exhaust gas pipe system includes several branch manifold means, and in that a plurality of branch connection means corresponding in number to the several branch manifold means are provided for connecting the exhaust gas branch line means with all said branch manifold means.

8. An installation according to claim 7, characterized in that exhaust gas manifold means includes an afterburner means, and in that the Venturi pipe means is arranged downstream of the afterburner means as viewed in a flow direction of the exhaust gas.

9. An installation according to claim 8, characterized in that the exhaust gas branch line means is connected with the exhaust gas pipe system between the afterburner means and the Venturi pipe means.

10. An installation according to claim 2, with the internal combustion engine constructed as a water-cooled engine including a cross-flow cylinder head, characterized in that at least a portion of the cooling water jacket means is arranged in the cylinder head, the passage means of the exhaust gas branch line means includes a first passage traversing the cylinder head from an exhaust side thereof to a suction side thereof and a second passage traversing the cylinder head from a suction side thereof to an exhaust side thereof with each passage extending through a part of the cooling water jacket means of the water-cooled engine.

11. An installation according to claim 10, characterized in that the closure valve means is arranged in the exhaust gas branch line means between the first passage through the cylinder head and the heat-exchange area.

12. An installation according to claim 1, characterized in that the Venturi pipe means forms a part of the exhaust gas manifold means.

13. An installation according to claim 1, characterized in that the exhaust gas branch line means is branched off from at least one portion of the exhaust gas pipe system located on an engine side of the gas jet pump means.

14. An installation according to claim 1, characterized in that the exhaust gas pipe system includes several branch manifold means, and in that a plurality of branch connection means corresponding in number to the several branch manifold means are provided for connecting the exhaust gas branch line means with all said branch manifold means.

15. An installation according to claim 1, characterized in that the exhaust gas manifold means includes an afterburner means, the Venturi pipe means is arranged downstream of the afterburner means as viewed in the flow direction of the exhaust gas.

16. An installation according to claim 15, characterized in that the exhaust gas branch line means is connected with the exhaust gas pipe system at a position between the afterburner means and the Venturi pipe means.

* * * * *